(12) United States Patent
Oberdieck et al.

(10) Patent No.: US 12,027,901 B2
(45) Date of Patent: Jul. 2, 2024

(54) METHOD AND DEVICE FOR REDUCING VOLTAGE LOADS OF SEMICONDUCTOR COMPONENTS OF AN INVERTER

(71) Applicant: Robert Bosch GmbH, Stuttgart (DE)

(72) Inventors: Karl Oberdieck, Neckartenzlingen (DE); Hadiuzzaman Syed, Stuttgart (DE); Manuel Horvath, Reutlingen (DE); Marco Graf, Tamm (DE); Sebastian Strache, Wannweil (DE); Stephan Schwaiger, Bodelshausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 12 days.

(21) Appl. No.: 18/155,342

(22) Filed: Jan. 17, 2023

(65) Prior Publication Data

US 2023/0231400 A1 Jul. 20, 2023

(30) Foreign Application Priority Data

Jan. 20, 2022 (DE) ..................... 10 2022 200 634.8

(51) Int. Cl.
*H02J 7/00* (2006.01)
*H02P 27/06* (2006.01)

(52) U.S. Cl.
CPC ............ *H02J 7/0068* (2013.01); *H02P 27/06* (2013.01)

(58) Field of Classification Search
CPC ............................... H02J 7/0068; H02P 27/06
USPC ......................................................... 307/18
See application file for complete search history.

(56) References Cited

U.S. PATENT DOCUMENTS

| | | | | |
|---|---|---|---|---|
| 6,140,800 A | * | 10/2000 | Peterson | H02J 7/0018 320/128 |
| 6,222,344 B1 | * | 4/2001 | Peterson | H02J 7/0014 320/119 |
| 6,841,971 B1 | * | 1/2005 | Spee | H02J 7/0016 320/119 |

(Continued)

FOREIGN PATENT DOCUMENTS

| | | |
|---|---|---|
| DE | 102013211038 B3 | 10/2014 |
| DE | 102018203363 A1 | 9/2019 |
| DE | 102020124387 A1 | 3/2022 |

*Primary Examiner* — Alfonso Perez Borroto
(74) *Attorney, Agent, or Firm* — NORTON ROSE FULBRIGHT US LLP; Gerard A. Messina

(57) ABSTRACT

A method and device for reducing voltage loads of semiconductor components of an inverter. The method includes: ascertaining a request to charge a battery of an electric system including the battery, the inverter, and an electric machine. The inverter including a series connection including a first and a second semiconductor component, and being configured to convert a direct voltage provided by the battery into an alternating voltage for the electric machine, and adapt a gate voltage of the first semiconductor component and/or of the second semiconductor component to interrupt a current flow between the battery and the electric machine during the charging. A voltage load of a gate oxide layer of the semiconductor components is reduced by decreasing the gate voltages of the first semiconductor component and of the second semiconductor component and/or a voltage load of a drain-source path of the semiconductor components being matched to one another.

10 Claims, 2 Drawing Sheets

(56) References Cited

U.S. PATENT DOCUMENTS 8,026,637 B2 * 9/2011 Seligman .............. H02J 7/0024
307/64

* cited by examiner

METHOD AND DEVICE FOR REDUCING VOLTAGE LOADS OF SEMICONDUCTOR COMPONENTS OF AN INVERTER

FIELD

The present invention relates to a method and to a device for reducing voltage loads of semiconductor components of an inverter and, in particular, of a three-phase inverter.

BACKGROUND INFORMATION

During a charging operation of a battery of an electrically driveable vehicle, which includes an electrical system that includes the battery, a traction inverter and an electric motor, the traction inverter is generally inactive. In this case, basically two system concepts are known for connecting the traction inverter. Either the traction inverter is separated via additional switches or it is set into, or left in, an inactive mode.

For reasons of costs, such additional switches are frequently dispensed with, so that semiconductors used in the inverter are loaded during the charging operation by a presence of a negative gate source voltage and by a presence of a portion of the so-called DC link voltage.

Vehicles are also available in the related art which enable a bi-directional charging operation, in which electrical energy stored in a battery of a vehicle is also able to flow in the opposite direction to an external charging station. This means that during time periods of a reversed energy flow as well, a loading of semiconductors of traction inverters as described above is also present, provided the semiconductors are not galvanically separated from the battery via additional switches.

SUMMARY

According to a first aspect of the present invention, a method is provided for reducing voltage loads of semiconductor components of an inverter which, for example, is a traction inverter of an electrically driven vehicle.

In a first step of the method according to an example embodiment of the present invention, a request to charge a battery of an electrical system is ascertained, which includes at least the battery, the inverter and an electric machine. In the event that the electrical system is a component of an electrically driveable vehicle, the electric machine is, for example, an electric motor of a drive train of the vehicle, the electrical system not being restricted to such an application and not to an application in a vehicle.

The request to charge the battery is generated, for example, by a charging device which, in the case of a charging operation of a vehicle, is electrically connected to the vehicle.

According to an example embodiment of the present invention, the inverter is configured on the basis of at least one series connection made up of at least one first semiconductor component and one second semiconductor component to convert a direct voltage provided by the battery into an alternating voltage suitable for the electric machine and to provide it to the latter. The semiconductor components are designed, for example, as MOSFETs, SiC-MOSFETs and/or as power semiconductors. It is also possible for further semiconductor components to be connected in parallel to the first semiconductor component and/or to the second semiconductor component, respectively, in order, for example, to switch high load currents. In such a case, all semiconductor components within a respective parallel circuit are preferably activated identically and simultaneously. An activation of the respective semiconductor components takes place preferably with the aid of an evaluation unit according to the present invention and/or with the aid of separate gate drivers, which may be connected to such an evaluation by means of information technology.

In a second step of the method according to an example embodiment of the present invention, a gate voltage (short for "gate source voltage") of the first semiconductor component and/or a gate voltage of the second semiconductor component is/are adapted in order to essentially interrupt a current flow between the battery and the electric machine during the charging of the battery. "Essentially" refers here to leakage currents normally present, which may also flow in the deactivated state of the semiconductor components via a source-drain path of the semiconductor components. Accordingly, the interruption of the current flow here represents a deactivated state of the first semiconductor component and/or of the second semiconductor component.

The adaptation of the gate voltage of the first semiconductor component and/or of the gate voltage of the second semiconductor component takes place in such a way that a voltage load of a gate oxide layer of the respective semiconductor components is reduced by decreasing the respective gate voltages of the first semiconductor component and of the second semiconductor component.

Alternatively or in addition, the adaptation of the gate voltages takes place in such a way that the voltage load of a drain-source path of the respective semiconductor components is matched to one another. Different voltage loads of the two semiconductor components may result due to differing conductances of the respective drain-source paths of the semiconductor components, which cause correspondingly different voltage drops over the two semiconductor components.

To match the voltage loads of the drain-source paths of the respective semiconductor components, voltage measurements are carried out with the aid of suitable voltage sensors, on the basis of which respective deviations of the voltage loads are ascertained. For this purpose, the respective voltage sensors are connected to the evaluation unit according to the present invention, for example, by means of information technology.

Due to the voltage loads of the semiconductor components being reduced and/or matched to one another, it is possible in this way to advantageously achieve a longer service life for the inverter if, for reasons of costs and/or space, etc., no switches are provided for a galvanic separation of the inverter during the charging operation. In addition, manufacturing tolerances of the semiconductor components may also be compensated for with the aid of the method according to the present invention, so that tolerance requirements of the semiconductor components may be reduced, as a result of which manufacturing costs of the semiconductor components may accordingly also be reduced.

These advantages take effect, in particular when, with respect to an overall service life, the semiconductor components used are operated proportionately largely in the deactivated state.

This may relate, in particular, to the aforementioned electrically driveable vehicles, whose useful time periods are generally significantly shorter than their charging time periods.

Preferred refinements of the present invention are disclosed herein.

In one advantageous embodiment of the present invention, respective drain-source voltages of the first semiconductor component and of the second semiconductor component are consistently set to an essentially identical value during the charging of the battery. In other words, not only an approximation of the drain-source voltages to one another, but also an identical characteristic of the drain-source voltages, is thus generated.

Alternatively, the first semiconductor component and the second semiconductor component are switched during the charging of the battery in each case alternatingly between conductive operation and non-conductive operation, in each case only one of the two semiconductor components being in conductive operation, whereas the respectively other of the two semiconductor components is in non-conductive operation and a respective total duration of the conductive operation of the two semiconductor components being essentially identical during the charging of the battery. In other words, a uniform voltage load of the two semiconductor components is also achieved in this way over time. This yields particular advantages, in particular, in connection with a subsequently described multi-phase design of the inverter, since the loading of the individual semiconductors in succession may be distributed to the semiconductors of different phases, so that an individual load of the respective semiconductors is correspondingly reduced.

According to an example embodiment of the present invention, the respective gate voltages of the first semiconductor element and of the second semiconductor element are particularly preferably set to 0 V or approximated to 0 V for reducing the voltage load of the respective gate oxide layer of the semiconductor components.

The respective gate voltages of the first semiconductor component and of the second semiconductor component are advantageously adapted for matching the voltage load of the respective drain source paths of the semiconductor components exclusively within a voltage range, which ranges from negative gate voltage values up to a predefined threshold value, the predefined threshold value falling below a threshold voltage of the respective semiconductor components. The predefined threshold value is preferably at least 1 V below the threshold voltage of the semiconductor components, so that a leakage current may be held to a minimum and/or the respective semiconductor is not unintentionally set in the activated state.

It is noted that this voltage load-reducing activation of the semiconductor components according to the present invention with respect to a level of the leakage current, in general, represents no problem even when the gate voltage approaches the threshold value, since this activation takes place during a charging mode of the battery, in which a power loss due to the leakage current is to the detriment of a charging device and not to the detriment of the battery.

In one further advantageous embodiment of the present invention, the inverter includes a plurality of series connections (for example, two or three or more half-bridge circuits or full-bridge circuits) made up of at least one first semiconductor component and one second semiconductor component, each series connection being configured to activate one phase each of a multi-phase electric machine (for example, a three-phase electric motor), the voltage loads of all these semiconductor components being reduced and/or being matched during the charging of the battery. The matching results preferably in a voltage difference of 0 V between the respective phases.

The respective gate voltages are advantageously adapted on the basis of a first voltage measurement, which represents a total voltage drop over the at least one series connection made up of at least two semiconductor components, and on the basis of a second voltage measurement, which represents a voltage drop over the semiconductor component that is situated in the series connection on the side with the lower potential (i.e., the "low-side" semiconductor component). In a traction inverter, generally three parallel phases are provided, which are short-circuited via a stator leakage inductance of an electric motor. As a result, it is possible to assume in first approximation that the voltage at all three phases is identical. Thus, the above-described use of a single phase voltage sensor is sufficient in order to measure the voltage across all semiconductors. This enables a particularly cost-effective design of the present invention since, even with a design of the inverter for multiple phases, only one phase voltage sensor is required.

In one further advantageous embodiment of the present invention, the voltage drop across the semiconductor component on the side with the lower potential is ascertained on the basis of a measured value of an NTC resistor, which is provided for a temperature detection of this semiconductor component, and on the basis of an estimated temperature of this semiconductor component. This yields the advantage that no additional voltage sensor must be arranged for the voltage measurement across the semiconductor component, since a present voltage measurement across the NTC resistor is frequently already present for ascertaining the temperature of the semiconductor component. With the NTC resistor being connected via a high-impedance resistance to the drain connection of the semiconductor component, it is thus possible to implement a particularly simple and cost-effective voltage measurement of the semiconductor component on the basis of a voltage divider formed as a result.

The matching of the voltage loads of the respective semiconductor components further advantageously takes place taking a present degradation of the respective semiconductor components into account, which is ascertained, in particular, with the aid of gate voltage variations. For this purpose, a variation of the gate voltage of the semiconductor components is provided in a voltage range below the threshold voltage (also referred to as "sub-threshold" range) of the semiconductor components in order to identify changes of the characteristic curve of the semiconductor components. Potentially established changes of the characteristic curve may subsequently be advantageously taken into account in the reduction of the voltage load of the semiconductor components.

According to a second aspect of the present invention, a device is provided for reducing voltage loads of semiconductor components of an inverter. According to an example embodiment of the present invention, the device includes a first semiconductor component, a second semiconductor component and an evaluation unit. The evaluation unit is designed, for example, as an ASIC, FPGA, a processor, a digital signal processor, a microcontroller or the like, and is connected preferably by means of information technology to a first gate driver and to a second gate driver, each of which is connected to control inputs (gates) of the two semiconductor components. The first gate driver and the second gate driver are integrated, for example, into the evaluation unit and/or designed as separate components. The evaluation unit is configured to ascertain a request to charge a battery of an electrical system, which includes at least the battery, the inverter and an electric machine (for example, an electric motor), the inverter being configured on the basis of at least one series connection made up of at least one first semiconductor component and one second semiconductor component (for example, MOSFETs in each case) to convert a direct voltage provided by the battery into an alternating voltage suitable for the electric machine and to provide it to the latter. The evaluation unit is further configured (preferably with the aid of the first gate driver) to adapt a gate voltage of the first semiconductor component and/or (preferably with the aid of the second gate driver) a gate voltage of the second semiconductor component in order to essentially interrupt a current flow between the battery and the electric machine during the charging of the battery, a voltage load of a gate oxide layer of the respective semiconductor components being reduced by decreasing the respective gate voltages of the first semiconductor component and of the second semiconductor component and/or a voltage load of a drain-source path of the respective semiconductor components being matched to one another. The features, feature combinations as well as the advantages resulting therefrom clearly correspond to those cited in connection with the first-mentioned aspect of the present invention in such a way that to avoid repetitions, reference is made to the foregoing explanations.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
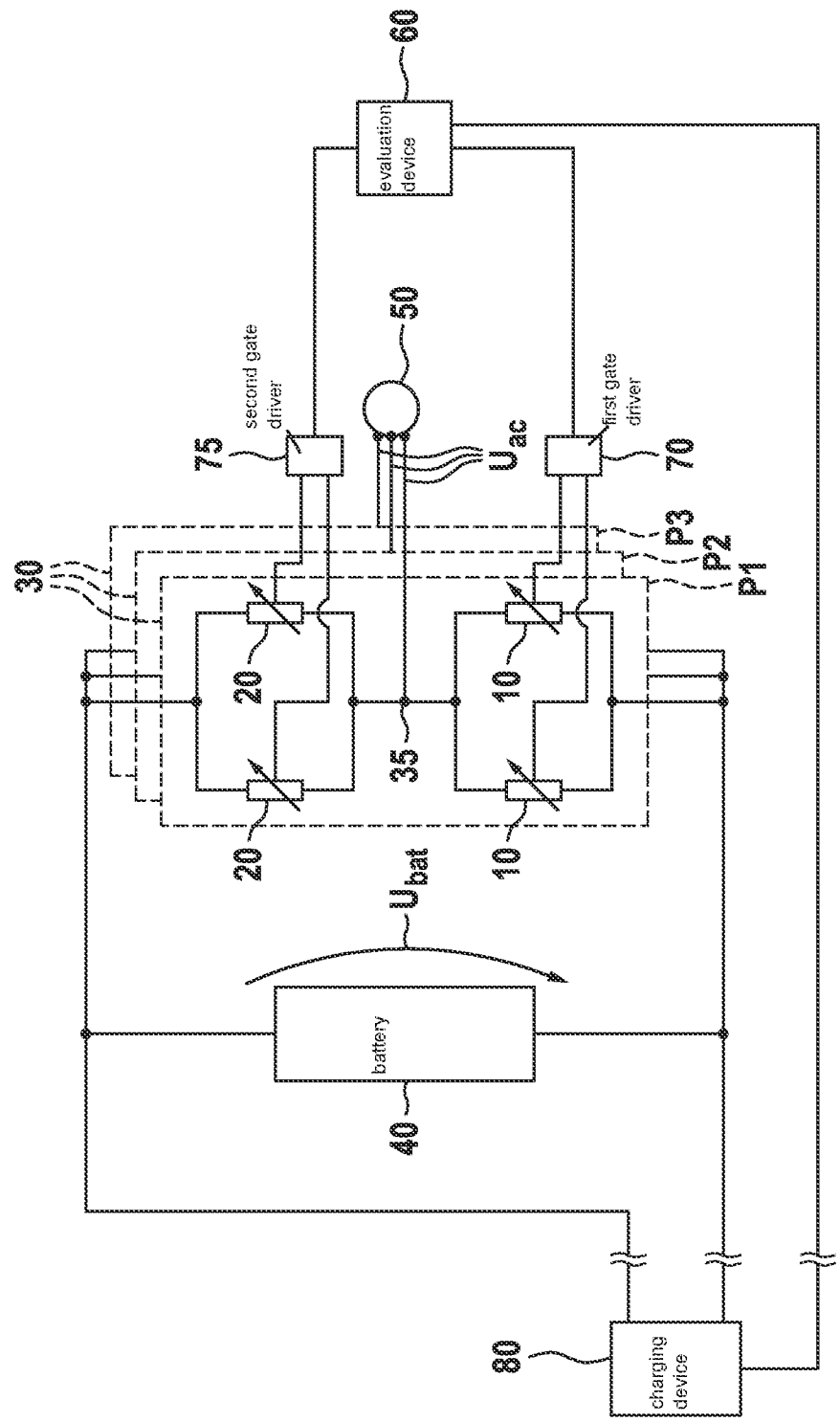
FIG. 1 shows a circuit diagram of one specific embodiment of a device according to the present invention.

FIG. 1 shows a circuit diagram of one specific embodiment of a device according to the present invention. The device includes an inverter 30, which is configured to convert a direct voltage of a battery 40 into a three-phase alternating voltage Uac. For the purpose of a simplified representation, the respective circuits of the three phases P1, P2, P3 are represented by dashed-line rectangles, only the circuit of first phase P1 being shown in detail as representative of all three phases P1, P2, P3. The further phases P2, P3 are designed similarly to first phase P1.

The circuit of first phase P1 includes two first MOSFETs 10 connected in parallel, which are connected in series to two second MOSFETs 20 connected in parallel. It is noted that MOSFETs 10, 20 are represented here simplified as controllable resistors, each of which represents the resistor of the drain-source paths of semiconductor components 10, 20. Respective center connections 35 of the circuits of the three phases P1, P2, P3 are electrically connected to an electric motor 50, so that inverter 30 is configured in this way to power electric motor 50 with the aid of a three-phase alternating voltage Uac.

The device according to the present invention further includes an evaluation unit 60, which is designed here as an ASIC and which is connected by means of information technology to a first gate driver 70 and to a second gate driver 75. Gate drivers 70, 75 in turn are electrically connected to respectively corresponding semiconductor components 10, 20. It is noted that the circuits of second phase P2 and of third phase P3 are designed similarly thereto, so that their gate drivers and respective electrical connections are omitted, however, for the sake of clarity.

Inverter 30 according to the present invention is not permanently electrically connected to a battery 40, battery 40 being configured to provide inverter 30 with a direct voltage Ubat.

Evaluation unit 60 is additionally configured to be connected by means of information technology to an external charging device 80, once charging device 80 is electrically connected to battery 40 via a charging cable (not shown).

Based on the above-described configuration, evaluation unit 60 is configured to ascertain a request to charge battery 40, which is output by charging device 80 in the form of a signal and, in the event of a present request to charge battery 40, to adapt a gate voltage of first semiconductor component 10 with the aid of first gate driver 10 and/or to adapt a gate voltage of second semiconductor component 20 with the aid of second gate driver 20 in order to essentially interrupt a current flow between battery 40 and electric machine 50 during the charging of battery 40.

In order to reduce a voltage load of respective drain-source paths of semiconductor components 10, 20, the adapted gate voltages are established in such a way that respective resistance values of the drain-source paths (or the drain-source voltages dropping across these paths) of first semiconductor component 10 in relation to second semiconductor component 20 are matched to one another to the extent possible, while the respective gate voltages are set as close as possible to a value of 0 V in order at the same time to reduce a voltage load of gate oxide layers of semiconductor components 10, 20.

As a basis for the adaptation of the respective gate voltages, voltage measurements are carried out in order to ascertain voltage differences between first semiconductor switches 10 and second semiconductor switches 20. For this purpose, a first voltage present via the series connections of inverter 30 on the one hand and a second voltage representing the voltage of first phase P1 on the other hand are ascertained. For the purpose of a clear representation, respective voltage sensors are not shown here.

Semiconductor components 10, 20 are advantageously activated to open and close alternatingly, so that the respective voltage loads of individual semiconductor components 10, 20 are reduced over time.

To match the drain-source voltages, the range within which the respective gate voltages are adapted is restricted to a range of negative values up to a predefined threshold value, which here is 1 V below a threshold voltage of semiconductor components 10, 20.

Figure 2:
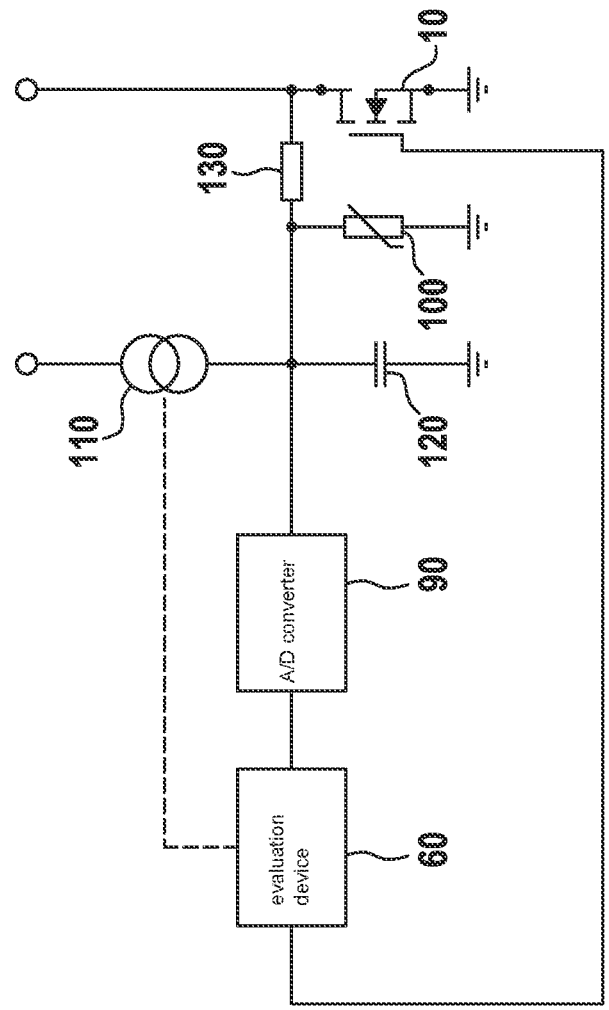
FIG. 2 shows a circuit diagram, which illustrates an exemplary phase voltage measurement according to the present invention.

FIG. 2 shows a circuit diagram, which illustrates an exemplary phase voltage measurement according to the present invention. For better clarity, only a first semiconductor component 10 of a inverter 30 according to the present invention is shown in FIG. 2, which also includes a second semiconductor component 20 situated in series to first semiconductor switching element (component) 10.

A conventional configuration for measuring a temperature of first semiconductor component 10 with the aid of an NTC resistor 100 is also shown, which is thermally coupled to first semiconductor component 10. For this purpose, NTC resistor 100 is normally fed via a current source 110, so that a voltage drop across NTC resistor 100 may be detected with the aid of an analog-to-digital converter 90.

A capacitor 120, which is connected in parallel to NTC resistor 100 is situated by way of example for a filtering of the voltage and for overvoltage protection.

According to the present invention, the preceding configuration is expanded by a high-impedance resistor 130 (for example, amounting to 1 megohm) which, in connection with NTC resistor 100, forms a voltage divider, which is connected in parallel to first semiconductor component 10 (here, a MOSFET) and is thus configured to carry out a DC link voltage measurement of inverter 30.

An evaluation unit 60 is further provided according to the present invention, which is configured to receive voltage values detected by analog-to-digital converter 90 and, on the basis of these voltage values and a piece of information about an instantaneous temperature of NTC resistor 100, to activate according to the present invention semiconductor components 10, 20. The piece of information about the instantaneous temperature of NTC resistor 100 may be ascertained, for example, on the basis of temperature sensors of adjacent phases and/or on the basis of temperature sensors, which measure a temperature of a coolant circuit for cooling semiconductor components 10, 20. Evaluation unit 60 is also configured to deactivate current source 110 during a charging operation of a battery 40 coupled to inverter 30, so that NTC resistor 100 may be used for measuring the phase voltage.

What is claimed is:

1. A method for reducing voltage loads of semiconductor components of an inverter, comprising the following steps:
   ascertaining a request to charge a battery of an electrical system, the electrical system including at least the battery, the inverter, and an electric machine, the inverter including at least one series connection made up of at least one first semiconductor component and at least one second semiconductor component, and being configured to convert a direct voltage provided by the battery into an alternating voltage suitable for the electric machine and to provide it to the electric machine; and
   adapting a respective gate voltage of the first semiconductor component and/or a respective gate voltage of the second semiconductor component to essentially interrupt a current flow between the battery and the electric machine during the charging of the battery,
   wherein: (i) a voltage load of a gate oxide layer of each of the first and second semiconductor components is reduced by decreasing the respective gate voltages of the first semiconductor component and of the second semiconductor component, and/or (ii) a voltage load of a respective drain-source path of each of the first and second semiconductor components being matched to one another.

2. The method as recited in claim 1, wherein respective drain-source voltages of the first semiconductor component and of the second semiconductor component are consistently set to an essentially identical value during the charging of the battery.

3. The method as recited in claim 1, wherein the first semiconductor component and the second semiconductor component are each switched alternatingly between a conductive operation and a non-conductive operation during the charging of the battery, and only one the first and second semiconductor components being in a conductive operation, with the respectively other of the first and second semiconductor components being in a non-conductive operation, and wherein a respective total duration of the conductive operation of the first and second semiconductor components being essentially identical during the charging of the battery.

4. The method as recited in claim 1, wherein the respective gate voltages of the first semiconductor component and of the second semiconductor component are set to 0 V or approximated to 0 V for reducing the voltage load of the respective gate oxide layer of the first and second semiconductor components.

5. The method as recited in claim 1, wherein to match the voltage load of the respective drain-source path of the first and second semiconductor components, the respective gate voltages of the first semiconductor component and of the second semiconductor component are adapted exclusively within a voltage range, which ranges from negative gate voltage values up to a predefined threshold value, the predefined threshold value falling below a threshold voltage of the respective first and second semiconductor components.

6. The method as recited in claim 1, wherein the inverter includes a plurality of series connections made up of at least one first semiconductor component and at least one second semiconductor component, each series connection being configured to activate one phase each of a multiphase electric machine, the voltage loads of all the first and second semiconductor components being reduced and/or matched during the charging of the battery.

7. The method as recited in claim 1, wherein the respective gate voltages are adapted based on a first voltage measurement, which represents a total voltage drop across the at least one series connection made up of at least the first and second semiconductor components, and a second voltage measurement, which represents a voltage drop across that semiconductor component of the first and second semiconductor components that is situated in the series connection on a side with a lower potential.

8. The method as recited in claim 7, wherein the voltage drop across the semiconductor component on the side with the lower potential is ascertained based on a measured value of an NTC resistor, which is provided for a temperature detection of the semiconductor component, and based on an estimated temperature of the semiconductor component.

9. The method as recited in claim 1, wherein the matching of the voltage loads of the first and second semiconductor components takes place taking a present degradation of the first and second semiconductor components into account, which is ascertained based on the gate voltage variations.

10. A device for reducing voltage loads of semiconductor components of an inverter, comprising:
    a first semiconductor component;
    a second semiconductor component; and
    an evaluation unit configured to:
       ascertain a request to charge a battery of an electric system, which includes at least the battery, the inverter, and an electric machine, the inverter including at least one series connection made up of the first semiconductor component and the second semiconductor component, and being configured to convert a direct voltage provided by the battery into an alternating voltage suitable for the electric machine and to provide it to the electric machine, and
       adapt a respective gate voltage of the first semiconductor component and/or a respective gate voltage of the second semiconductor component to essentially interrupt a current flow between the battery and the electric machine during the charging of the battery,
       wherein: (i) a voltage load of a gate oxide layer of the first and second semiconductor components being reduced by decreasing the respective gate voltages of the first semiconductor component and of the second semiconductor component, and/or (ii) a voltage load of a respective drain-source path of each of the first and second semiconductor components being matched to one another.

* * * * *